Sept. 1, 1964  T. W. KIRKCONNELL ETAL  3,146,663
EDUCATIONAL PROJECTION APPARATUS
Filed Jan. 3, 1961
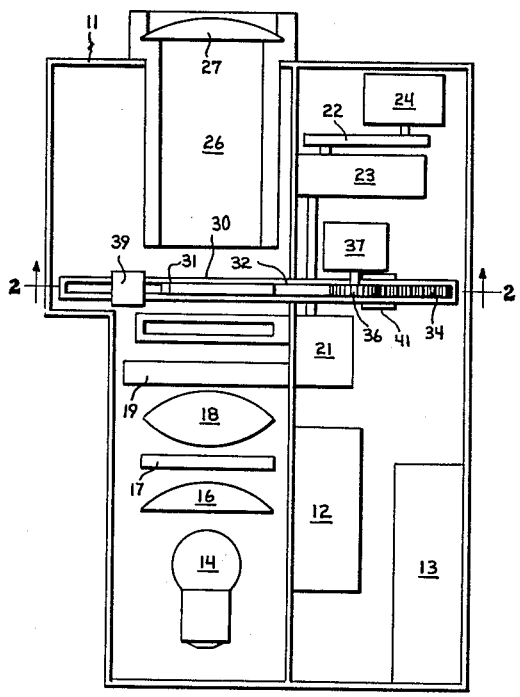
Fig. 1.
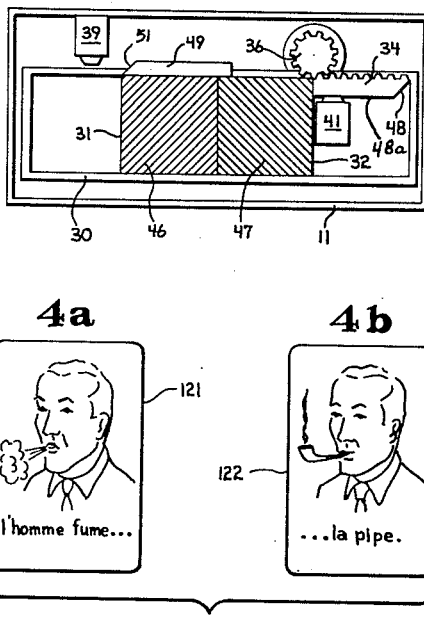
Fig. 2.
Fig. 4.
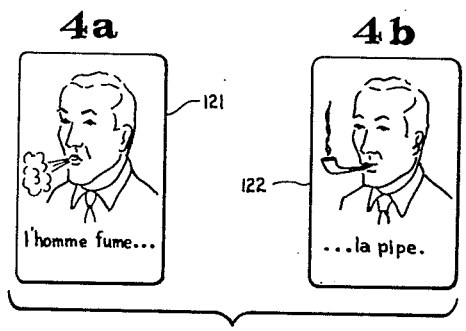
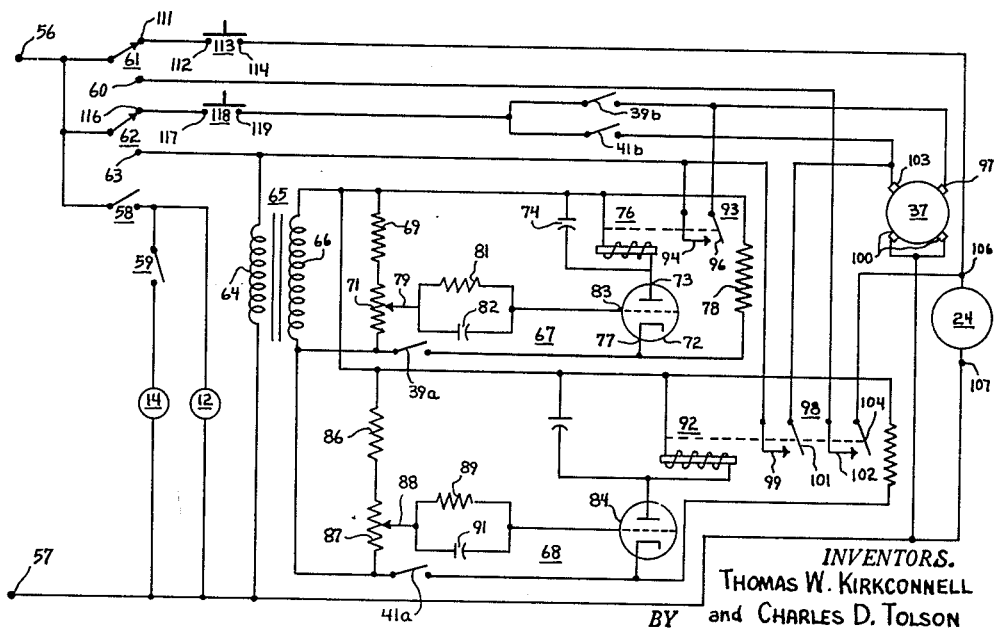
Fig. 3.
INVENTORS.
THOMAS W. KIRKCONNELL
BY and CHARLES D. TOLSON
Lockwood, Woodard, Smith & Wiikert
Attorneys

United States Patent Office 3,146,663
Patented Sept. 1, 1964

3,146,663
EDUCATIONAL PROJECTION APPARATUS
Thomas W. Kirkconnell, 1203 N. 3rd St., and Charles D. Tolson, 818 Barnett St., both of Vincennes, Ind.
Filed Jan. 3, 1961, Ser. No. 80,182
4 Claims. (Cl. 88—24)

This invention relates generally to audio-visual educational methods and more particularly to apparatus employing optical projection of educational media.

The term audi-visual generally refers to a method of education which employs motion pictures with a sound track. The motion pictures or movies are generally presented to a group and have afforded a very fine supplement to conventional classroom instruction. However, sound movies have some disadvantages.

One disadvantage of sound movies lies in that relatively expensive equipment is required including cameras, projectors, and film reels. Moreover, sound movies do not lend themselves readily to interruption and to study of specific portions of the content of the movie. It is apparent, therefore, that if the instructor has particular comments he wishes to make or if he wishes to dwell on a certain particular area of study during a movie, he is somewhat restrained. There are many areas where this can actually be a handicap, and particularly is this true in the field of languages.

It is, therefore, a general object of this invention to provide a means for audio-visual education providing an automatic projection of a succession of pictures but permitting concentration on specific pictures when desired.

It is a further object of this invention to provide means and method for supplementing conventional classroom study by projected study helps which may be retained for contemplation as long as desired.

It is a further object of this invention to provide means of the foregoing character wherein a novel semi-animated effect can be readily obtained to cultivate interest and amplify explanations.

It is a still further object of this invention to provide simple and inexpensive means for audio-visual education.

This invention includes in its scope a light projecting apparatus which incorporates a light source and a lens system and uses vectographic elements, normally in the form of slides but which can take other forms, to produce projected pictures. A semi-animated effect can be obtained by providing a pair of polarized light transmitting sheets (polarizer sheets). Each of these sheets has an axis of polarization which is perpendicular to that of the other. By introducing first one and then the other of the sheets into the light path produced by the lens system, the polarization of the projected light is controlled and the animated effect obtained.

A novel circuit is incorporated in the projector to permit either automatic or manual changing of slides and automatic or manual movement of the sheets according to the wishes of the operator. Movement of the slides and sheets can be coordinated with an audio reproduction if desired.

In the application of the invention to foreign language instruction, matching foreign language captions (illustrated by the vectographic pictures) are included on each of the two layers of the vectographic slide (see FIGS. 4a "The Man Smokes". . . and 4b a"A Pipe"). When the polarizer sheets of our projector are changed in position, either automatically or manually, the initial sentence fragment "The Man Smokes" is first produced by one vectographic layer of the slide, and then the sentence completion "A Pipe" is produced by the other vectographic layer of the typical slide. Thus, a fade-in and fade-out or "magic slate" effect can be projected on the screen with title-change matching the animated changes of the pictures.

The full nature of the invention will be understood from the accompanying drawings and the following description and claims:

FIG. 1 is a top schematic view of a projector incorporating the present invention.

FIG. 2 is a view taken along the line 2—2 of the embodiment of FIG. 1.

FIG. 3 is a schematic diagram of the novel circuit used to operate the projector of FIG. 1.

FIG. 4 comprising FIG. 4a and FIG. 4b is exemplary of a type of educational material which may be used according to the present invention.

Referring to FIG. 1, showing schematically a top view of our projector, frame 11 supports a conventional cooling blower 12 and an electronic package 13 employed to control the projector. The projector includes a lamp 14, lenses 16, 17 and 18 and a seat 19 upon which slides rest while in position for projection.

The frame 11 supports a conventional slide changing mechanism 21 which is connected through a conventional linkage 22 and gear box 23 to a slide changer motor 24. The changer motor may conveniently be a series or induction type. The frame also supports a projection lens 26, the forward end of which 27 transmits light to a distant projection surface such as a conventional screen (not shown). The operative arrangement of components described in this and the previous paragraph, except for electronic package 13, may be found in projectors well known in the art.

A pair of oppositely polarized, light polarizing sheets 31 and 32 is received in an opening of a holder 30 such that the sheets can be positioned alternately in the light path between the lens 18 and the projection lens 26. The polarizer sheets 31 and 32 have fastened thereto a gear rack 34. The rack 34 is meshed with a gear 36 driven by the polarizer sheet shift motor 37. A repulsion start, induction-run motor may be conveniently employed here. A pair of switches such as, for example, microswitches 39 and 41, is rigidly mounted with respect to the frame 11 for position sensing and other purposes which will become apparent as the description proceeds.

Referring to FIG. 2 which is a section taken along the lines 2—2 of FIG. 1, the holder 30 can be seen to function in this embodiment as a guide track for the polarizer sheets. The lines 46 and 47 set at 45° angles represent the oppositely polarized character of the two sheets. The rack 34 has a ramp 48 at the end thereof which provides for an easy engagement with the microswitch 41 when the sheets are moved to the position in which they are shown. A cam 49 having a similar ramp 51 is fastened to the polarizer sheet assembly to actuate the microswitch 39 when the sheets are moved by the gear 36 to their alternate position.

FIG. 3 is a schematic of the electronic package 13 of FIG. 1. In FIG. 3, input terminals 56 and 57 are provided for connection of the electronic package to a source of electrical energy usually in the form of alternating current. Blower 12 is connectable across the input terminals 56 and 57 by means of switch 58. The lamp 14 is connectable across the input terminals by means of switch 58 and switch 59.

A pair of switches 61 and 62 have movable contactors connected to terminal 56. Switch 61 provides for either automatic or manual control of the slide changer motor 24. Switch 62 provides for either automatic or manual control of the polarizer shift motor 37. The switches may be of the single pole, double throw type and are normally linked so that both are in the manual or automatic position simultaneously. So employed, they can be operated by a single actuator and may be referred to as "mode-selector" switches.

Fixed contactors 63 of switch 62 is connected to one end of the primary winding 64 of transformer 65, the other end of which is connected to terminal 57. The secondary winding 66 of transformer 65 provides a supply to the control circuits 67 and 68.

Control circuit 67 includes a serial combination of resistance 69 and a tapped resistance 71 connected across the winding 66. There is also a triode 72 having an anode 73 operatively coupled to solenoid switch 76 through the winding thereof, which winding is coupled in turn to one side of the secondary winding 66. The triode 72 has a cathode 77 connectable through contacts 39a of the microswitch 39 to the other side of the winding 66. A resistance 78 is connected through contacts 39a of microswitch 39 across the winding 66.

An adjustable tap 79 for the tapped resistance 71 is connected through the RC parallel combination of resistance 81 and capacitor 82 to the grid 83 of triode 72.

Control circuit 68 is similar to circuit 67 with the exception that contacts 41a of the microswitch 41 couples triode 84 to the winding 66. Resistance 86 and tapped resistance 87 are connected across the winding 66. The variable tap 88 of resistance 87 connects the grid of triode 84 through an RC circuit consisting of resistance 89 and capacitor 91 to the source of potential available at winding 66. The winding of solenoid switch 92 is controlled by the triode 84.

In FIG. 3, the switch 93 controlled by solenoid 76 includes a fixed contact 94 connected to fixed contactor 63 of switch 62. A movable contactor 96, engageable with the fixed contactor 94 upon energization of the winding of solenoid 76, is connected to terminal 97 of the shift motor 37.

The switch 98 controlled by solenoid 92 includes a fixed contactor 99 connected to fixed contactor 63 of switch 62. It also includes a fixed contactor 102 connected to fixed contactors 60 of switch 61. Movable contactor 101 is connected to terminal 103 of shift motor 37. The remaining terminals 100 of shift motor 37 are tied to input terminal 57. Movable contactor 104 of switch 98 is connected to terminal 106 of slide changer motor 24. The other terminal 107 of the slide changer motor 24 is connected to input terminal 57.

Referring again to switches 61 and 62 in FIG. 3, each is provided with a fixed contactor in addition to those already mentioned. Switch 61 has a fixed contactor 111 connected to contactor 112 of normally-open, button-operated switch 113. The other contactor 114 of switch 113 is connected to terminal 106 of the slide changer motor.

Switch 62 has a fixed contactor 116 connected to contactor 117 of the normally-open button-operated switch 118. The other contactor 119 of switch 118 is connected to the sets of contacts 39b and 41b of microswitches 39 and 41, respectively. Set 39b is connected in turn to terminal 97 of the shift motor. Set 41b is connected to terminal 103 of the shift motor.

To explain the operation of the circuit of FIG. 3, it is convenient to begin with the polarizer sheets in the position shown in FIG. 2. In this position, the two sets of contactors of microswitch 41 are closed by virtue of cam action of the ramp 48 and the rear side of the rack 34. With microswitch 41 contactors closed, upon placing the movable contactor of switch 62 into connection with fixed contactor 63 thereof, an electrical potential is applied across the triode 84. This triode will begin to conduct when there is sufficient charging of the capacitor 91 to turn triode 84 on. When triode 84 is turned on, the solenoid 92 is energized closing the contacts of the switch 98. This applies to potential across terminals 103 and 100 of the shift motor 37. It also closes the circuit across the changer motor 24 so that at the same time, the shift motor moves the polarizer sheets, the changer motor changes slides.

Once started, shift motor 37 continues to operate even though microswitch 39 is "open" and the sheets are moving away from the microswitch 41, because the rear side 48a of the rack 34 continues to keep microswitch 41 closed until just before microswitch 39 is closed by cam 49. When the polarizer sheets are shifted by the motor 37, the cam 49 closes the contactors of microswitch 39 and those of microswitch 41 are allowed to open disconnecting the shift motor and changer motor from the electrical supply. However, upon the closing of microswitch 39, capacitor 82 begins to charge and upon reaching sufficient charge, will turn on triode 72, energizing the solenoid 76. This closes the contacts of switch 93 and applies a potential across the terminals 97 and 100 of shift motor 37. This activates the shift motor in the opposite direction and causes the polarizer sheets to be returned to their initial position. However, the changer motor 24 is not actuated at this time.

Referring to FIG. 4, it will be noted that there are two prints 121 and 122 each having a picture thereon with an appropriate caption. This figure represents an example of a type of figures which can be employed for educational purposes on opposite sides of a vectographic transparency. It will be apparent that by shifting the polarizer sheets so that first one and then the other is in the light path between the bulb 14 and the projection lens 26, a "magic slate" effect can be obtained on the screen to produce semi-animation or title changes. In the operation of the invention, the slides employed are of the vectographic type and generally each vectographic image and caption is slightly different from that on the opposite side of the slide. By employing a magazine of slides in the manner of using magazines of conventional slides and by shifting the polarizer sheets while observing each slide, the magic slate effect is obtained and can be employed as was noted above for either semi-animation or title changes or both.

If manual changing of a slide is desired, this can be accomplished at any time by placing the movable contactor of switch 61 in contact with contactor 111 thereof and closing switch 113. If manual control of the polarizer sheets is desired, this can be accomplished by placing the movable contactor of the switch 62 into contact with fixed contactor 116 and closing switch 118. If manual control of both slide changing and polarizer sheets shifting is desired, the movable contactors of switches 61 and 62 can be linked so that they are moved from "manual" to "automatic" position and vice-versa simultaneously.

The rate of shifting of the polarizer sheet or the frequency at which it is shifted in the "automatic" mode of operation, can be controlled by adjustment of the movable taps 79 and 88 of the tapped resistances 71 and 87, respectively. For example, times of 20–200 seconds between shifts have been used. Moreover, the time for each half cycle is independent of that of the other.

Our invention adds immensely to the interest and educational worth of the projection method of instruction to an extent comparable with that achieved by motion pictures. At the same time, the changing of slides can be halted so that any particular lesson or passage can be studied at length affording an advantage not available with movie equipment. Of course, this equipment makes possible the study of a course in the absence of an instructor and the slides can be supplemented by means of a conventional phonograph or magnetic tape or other type of audio reproducing system if desired.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

We claim:

1. In a projection apparatus adapted to project images from slides and having light polarizers, an operating circuit comprising: input means for a source of electrical energy; a lamp and blower switchably coupled to said input means; shift means to shift light polarizers; a slide changer; a first shift means control circuit coupled through mode selector switch means to said input means and including an electron discharge device coupled through a sheet position sensing switch and operatively coupled to a first switch coupled to said shift means to cause said shift means to move said light polarizers in one sense; a second shift means control circuit coupled through said mode selector switch means to said input means and including an electron discharge device coupled through a sheet position sensing switch and operatively coupled to a second switch coupled to said shift means to cause said shift means to move said light polarizers in a sense opposite said one sense, said second switch being coupled also to said slide changer; a manually operable switch coupled to said mode selector switch means and to said slide changer for manual operation of said slide changer; a manually operable switch coupled to said mode selector switch means and to said shift means for manual control of movement of said polarizers.

2. In a projection apparatus having slides and light polarizing sheets, an operating circuit comprising: input means for a source of electrical energy; a lamp and blower switchably coupled to said input means; a shift motor to shift light polarizing sheets; a slide changer motor; a first shift motor control circuit coupled through a coupling transformer and mode selector switch means to said input means and including, a triode having an anode coupled through a first solenoid switch control winding to a transformer winding and a cathode coupled through a cam operated switch to said transformer winding to make a circuit and a grid coupled through a capacitor to the variable tap of a resistance branch connected across said transformer winding, switch contacts operable by said first solenoid switch to connect said shift motor to said input means to cause said motor to move light polarizing sheets in one direction; a second shift motor control circuit coupled through a coupling transformer and said mode selector switch means to said input means and including, a triode having an anode coupled through a second solenoid switch control winding to a transformer winding and a cathode coupled through a cam operated switch to said transformer winding to make a circuit and a grid coupled through a capacitor to the variable tap of a resistance branch connected across said transformer winding, switch contacts operable by said second solenoid switch to connect said shift motor to said input means to cause said motor to move said sheets in a direction opposite said one direction; switch contacts operable by said second solenoid switch to connect said slide changer motor to said input means; a manually operable switch coupled to said mode selector switch means and to said slide changer motor for manual operation of said slide changer motor; a manually operable switch coupled to said mode selector switch means and to said shift motor for manual control of movement of said light polarizing sheets.

3. In a projection apparatus adapted to project images from translucent slides and having light polarizes to selectively polarize projected light, a control system comprising: shifting means for shifting light polarizers; changer means for changing slides; an electrical input; first and second position sensing means coupled to said polarizers; a first timing circuit coupled to and actuated by the first position sensing switch and coupled to said input and to said shifting means to actuate said shifting means at a selectably predetermined time after actuation by said first position sensing switch; and a second timing circuit coupled to and actuated by the second position sensing switch and coupled to said input, to said shifting means, and to said changer means to actuate said shifting means and said changer means at a selectably predetermined time after actuation by said second position sensing switch.

4. In a projection apparatus adapted to project images from translucent slides and having light polarizers to selectively polarize projected light, a control system comprising: shifting means for shifting light polarizers; changer means for changing slides; and electrical input; first and second position sensing means coupled to said polarizers; a first timing circuit coupled to and actuated by the first position sensing switch and coupled to said input and to said shifting means to actuate said shifting means at a selectably predetermined time after actuation by said first position sensing switch; a second timing circuit coupled to and actuated by the second position sensing switch and coupled to said input, to said shifting means, and to said changer means to actuate said shifting means and said changer means at a selectably predetermined time after actuation by said second position sensing switch; and mode selector switch means coupled between said input and said timing means and between said input and said shifting means and changer means for selecting either manual or automatic control of said shifting and changer means; a manually operable switch coupled between said mode selector switch means and said changer means to manually operate said changer means; a manually operable switch and position sensing switches coupled between said mode selector switch means and said shifting means for manual operation of said shifting means.

References Cited in the file of this patent

UNITED STATES PATENTS

| | | |
|---|---|---|
| 2,165,974 | Land | July 11, 1939 |
| 2,670,654 | Norman | Mar. 2, 1954 |
| 2,977,845 | Boone | Apr. 4, 1961 |
| 2,995,981 | Tamarin | Aug. 15, 1961 |
| 3,079,840 | McMaster et al. | Mar. 5, 1963 |